(12) United States Patent
Shteyn

(10) Patent No.: US 6,791,529 B2
(45) Date of Patent: Sep. 14, 2004

(54) UI WITH GRAPHICS-ASSISTED VOICE CONTROL SYSTEM

(75) Inventor: Yevgeniy Eugene Shteyn, Cupertino, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 109 days.

(21) Appl. No.: 10/017,067

(22) Filed: Dec. 13, 2001

(65) Prior Publication Data

US 2003/0117365 A1 Jun. 26, 2003

(51) Int. Cl.[7] .................................................. G09G 5/00
(52) U.S. Cl. ....................... 345/156; 345/157; 345/173; 345/174; 345/175; 345/179
(58) Field of Search ................................ 345/156, 157, 345/173, 174, 175, 179, 810, 815, 660, 661, 666, 668, 835, 840

(56) References Cited

U.S. PATENT DOCUMENTS 6,100,889 A * 8/2000 Sciammarella et al. ..... 345/815
6,211,856 B1   4/2001 Choi et al.
6,369,803 B2 * 4/2002 Brisebois et al. ........... 345/173

FOREIGN PATENT DOCUMENTS

| EP | 0 651 372 | 5/1995 |
| EP | 0 680 035 | 11/1995 |
| WO | WO 01 78054 | 10/2001 |

OTHER PUBLICATIONS

U.S. S/N 09/464,855, filed Dec. 16, 1999 of Willem Bulthuis et al, for "Hand–Ear User Interface for Hand–Held Device".
U.S. S/N 09/568,932, filed May 11, 2000 of Yevgeniy E. Shteyn, for "Electronic content Guide Renders Content Resources Transparent".

* cited by examiner

Primary Examiner—Dennis-Doon Chow
(74) Attorney, Agent, or Firm—Edward W. Goodman

(57) ABSTRACT

An electronic device has a UI that provides first user-selectable options. Second user selectable options are made available upon selection of a specific one of the first options. An information resolution of the first options, when rendered, differs from the information resolution of the second options when rendered. Also, a first modality of user interaction with the UI for selecting from the first options differs from a second modality of user interaction with the UI for selecting from the second options.

12 Claims, 4 Drawing Sheets

UI WITH GRAPHICS-ASSISTED VOICE CONTROL SYSTEM

FIELD OF THE INVENTION

The invention relates to a user interface (UI), in particular to a multi-modal UI for devices with small screen size, such as handheld information appliances (palmtops, electronic watches, organizers, mobile phones, Web pads, remote controls, PDA's or notebook computers, etc.)

BACKGROUND ART AND SUMMARY OF THE INVENTION

Current trends indicate that by 2002 there will be 1B subscribers worldwide to mobile phones. By 2004 there will be more mobile phones in use than PC's.

Mobile phones have become personal, trusted devices. Mobile phones, such as the Genie manufactured by Philips Electronics, typically have an LCD as part of the user interface and there is a trend to provide an even larger number of onboard software services. The phone has speech control capabilities as well.

Hand-held computing devices, such as personal digital assistants (PDA), e.g., the Palm manufactured by 3COM or a Windows CE-based iPAQ handheld, can be connected to the Network via a wireless modem, or 2.5 G (e.g., GPRS) or 3 G (e.g., DoCoMo) services. As a result, ubiquitous information access via the Internet has become reality. The latter services enable the device to stay always connected and to access information, such as e-mail, instant messages, phone calls over IP, audio/video and personal schedule or calendar. Wireless LAN and PAN connectivity standards, such as 802.11b and Bluetooth, enable PDAs and mobile phones to interact with a variety of information content, located on the respective networks. A combination of GPRS and 802.11b connectivity provides for seamless roaming between different networks: wide-area network (WAN), local-area network (LAN) and personal-area network (PAN). Studies further indicate that the functionalities of PDA's and mobile phones have started to converge, and that a mobile information society is developing. There will be an emerging of dedicated devices. PDA's are now work-related. In the near future, PDA's will be personalized computers that stay with the user all the time. PDA's will get more power and smaller size and accommodate more, and more versatile, functionalities. Most connected devices can be controlled via a UI by selecting an icon, a menu item or a list item using a touch screen, or by voice, by selecting an item using voice recognition software and hardware, or by using dedicated hardware interfaces, such as buttons, scroll wheels, etc.

Convenience and user-friendliness are believed to be the factors that limit the usability and practicality, be it a mobile phone, a palmtop, a PDA or an electronic watch. In particular, the UI and the service accessibility for connected personal devices have become critical factors for market acceptance. In particular, e-commerce or electronic shopping may benefit from the ubiquity of personal communication devices if the user interface technology enables users to employ best options for interaction with a wide variety of digital content and communication options.

This invention addresses, among other things, providing a method and apparatus to facilitate user-access to information, control and communication options by providing the user with multiple interface modalities, each of which is most suitable for a particular multi-step task. A further aspect of this invention relates to a method and apparatus to enable modality selection based on the information resolution for a particular information access, control or communication task. Another aspect of the invention enables the customization of the UI modality selection.

The term "information resolution" used in this text refers specifically, but not exclusively, to a property of a collection of information items that determines the user's ability to discriminate between different items when perceived via visual, auditory, tactile or other sensory means. For example, the resolution is associated with the relative distance between items selected or acted upon, when rendered on a display monitor (spatial distance), captured by a microphone or played out via a loudspeaker (temporal distance). The proper resolution or resolution interval may be dependent on the individual user, on the UI modality, device capabilities, environmental conditions and on other factors. For example, U.S. Pat. No. 6,211,856 issued to Sung Choi and Jan van Ee, and incorporated herein by reference, relates to a graphical user interface touch screen for displaying controllable functions of an electronic device. The function is displayed as an icon and at a scale size in which the function is recognizable by a user but too small to easily access features of the function. A magnified version of at least an area of the icon is provided upon the user touching the area of the icon. In the above-mentioned example, the first information resolution is too low for the user to affect the desired task, e.g. keystroke, with a high degree of confidence in its outcome. The magnified version increases the information resolution, specifically the control aspect of it, by increasing the size of each icon representing a corresponding action. In that case information resolution is increased directly in the same logical dimension (graphical representation) by increasing originally insufficient size to the acceptable level.

The inventor has realized that information resolution can be affected by using specific UI modalities to render the information for the user's perception. Alternative UI modalities can be used to provide different ranges of information resolution. The term "modality" refers to one or more specific modes of sensation, or to one or more specific ones of the sensory perceptions (e.g., hearing, vision, kinesthesia) and/or corresponding physiological processes (e.g., voice input/output, auditory feedback, graphical input/feedback, touch input/feedback) involved in the user interaction with the UI. The information items can be represented explicitly (e.g., graphically, auditory) or implicitly (e.g., presence intuitively clear or by experience, or indicated by a mnemonic) in the UI.

Accordingly, the invention relates to an electronic device with a UI. The UI provides first user-selectable options. Second user selectable options available upon selection of a specific one of the first options. An information resolution of the first options, when rendered, differs from the information resolution of the second options when rendered. A first modality of user interaction with the UI for selecting from the first options differs from a second modality of user interaction with the UI for selecting from the second options. Preferably, at least the first modality or the second modality is programmable in a configuration mode of the UI. In this manner, the user can configure the way in which to interact with the UI depending on, e.g., his/her preference or the information resolution at the various levels in the menu. For example, in a multi-layered menu, a layer comprises a large number of first options, and another layer comprises a smaller number of second options. It may be more convenient to select from among the first options using, e.g., a touch screen, and from among the second options using voice input.

Preferably, an additional modality of the user interaction with the UI is available for the selecting from at least the first or the second options. In an embodiment of the invention, the device comprises a communication functionality, e.g., of a phone, an instant messager, or an email handler, etc.

In a further embodiment, the device has a touch screen, and a microphone for voice input. One of the first and second modalities involves touching the touch screen, and the other of the first and second modalities involves the voice input.

In another embodiment of the invention, the device comprises a display monitor for rendering at least some of the first options; first means for enabling the user to associate each respective one of the rendered first options with a respective one of a plurality of predetermined attributes; and second means for selecting a specific one of the rendered first options through the associated attribute.

The invention also relates to a method of providing a UI for enabling to select options arranged in first and second layers. When rendered in the UI, the options in the first layer have an information resolution that differs from the information solution of the options in the second layer when rendered in the UI. The method comprises providing a first modality to select a first one of the options in the first layer, and the first modality differs from a second modality to select a second one of the options in a second layer. The invention can be used with, e.g., a Web site to provide a user-friendly or customized interface.

The invention further relates to software for use on an electronic device for generating a UI that provides first user-selectable options, and second user selectable options available upon selection of a specific one of the first options, wherein an information resolution of the first options when rendered differs from the information resolution of the second options when rendered, and wherein a first modality of user interaction with the UI for selecting from the first options differs from a second modality of user interaction with the UI for selecting from the second options. An electronic device such as a laptop, PDA or mobile communication apparatus, thus can be upgraded to suit the needs and preferences of the user.

BRIEF DESCRIPTION OF THE DRAWING

The invention is explained in further detail below, by way of example, and with reference to the drawing wherein.

Throughout the figures, same reference numerals indicate corresponding or similar features.

DETAILED EMBODIMENTS

Figure 1:
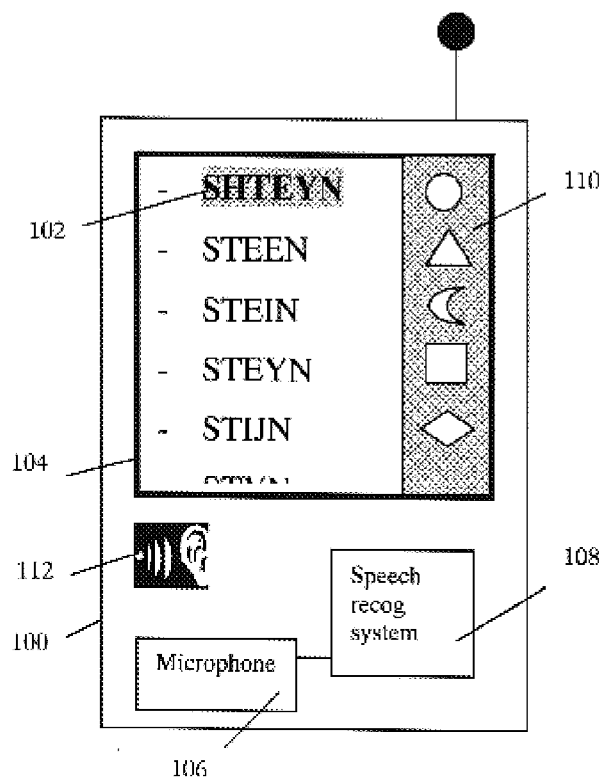
FIGS. 1–3 are diagrams of a device with a UI showing successive layer in a menu.

The user-friendliness of a UI of a device depends on, among other things, the modality of user interaction with the UI, the information resolution of the items to interact with when rendered in the UI, and environmental influences. The resolution can be considered as dependent on some or all of the following quantities: the modality of the user-interaction, the set of the specific items rendered, environmental influences and the task the device is supposed to perform.

For example, a set of names in a telephone directory can be rendered graphically on a touch screen, and the user can select from the set a specific name by touching the screen at the location where the specific name has been rendered. The selection of the specific name can also performed using speech recognition. However, the names are typically arranged alphabetically, and the set rendered may comprise names that begin with the same text characters, and therefore with the same phonemes. This causes the resolution for the voice modality to be rather low. Also, if there is ambient noise, the speech or voice recognition may be hampered thus adversely affecting the resolution for the voice modality.

More specifically, consider the following example of a device in the invention: a phone-based electronic address book, wherein a specific address set can be selected by touching its image on the screen's GUI or, alternatively, by saying the name of the person, using a speech recognition system. The address book provides options to call or email or send an instant message to the person. Then, in order to e-mail the selected person, the user may either touch a corresponding email icon or say the name ("email") of the option. Information resolution of the voice interface for selecting a particular name in the first step can be quite low due to, e.g., phonetic similarities between listed names. Also, typical speech recognition systems need to be trained and adapted to the individual user. On the other hand, saying "e-mail" would be a faster and more precise option to access the second function, owing to the limited number of, and the pre-determined character of, the contact options. It can be accomplished even without opening the second GUI. In order to enable the user to take advantage of a better UI option at every step, the system can determine the best modality and provide modality clues, e.g., an icon or another representation of the recommended modality. In the above mentioned phone book example, the system may show a "stylus" icon on the first step and a "voice" icon on the second. Alternation of recommended modalities also enables to speed up access to a particular function before accessing the next UI module. For example, after highlighting an addressee on a screen, e.g., by using a scroll wheel, the user is enabled to use voice command, e.g., "call home", to activate a particular function associated with the item, but not explicitly presented. This type of interaction could be especially useful in one-hand operations. Within this context, see, e.g., U.S. Ser. No. 09/464,855 filed Dec. 16, 1999 for Willem Bulthuis et al., for HAND-EAR USER INTERFACE FOR HAND-HELD DEVICE, herein incorporated by reference. This patent document relates to a hand-held device that enables the user to select options from a menu using only one hand and without having to look at the device. The device comprises a user-interface for user-interaction with the device. The user-interface has a navigating input for enabling the user to navigate in set of options; a feedback output to provide respective auditory feedback to the user about a respective selectable one of the options while the user is navigating; and a validating input to enable the user to select the current option based on the feedback. Preferably, a hand-held version of the device, such as a mobile phone, has a thumb wheel or another step-through component that lets the user scan a linear or circular array of options. Each respective one of the options is represented by a respective audio output that gets played out when the wheel is turned a notch up or down. This enables the user to select an option with one hand and without having to look at the device. It also allows for a form factor smaller than that of conventional mobile phones, as a keypad is not needed for entering digits to make a call from a personalized directory.

As to the invention, an information dimension of a higher resolution can be added to further facilitate the selection process. In the above-mentioned address book example an attribute column is added to the current address list page. The column contains, e.g., visually different shapes, associated with the address book records being displayed. The shapes may also be colored differently to further increase the information resolution and the number of available combinations. The shapes and/or colors are not associated with a particular item in the database, e.g., addressee name, but rather with a position of a particular item on the screen, e.g., a line. The items in the attribute column stay substantially the same as the user scrolls up or down the list. The user accesses an individual record by saying the name of the shape and/or its color, which is currently associated with the record as displayed. For example, the phrase "blue circle" would select a record marked with the corresponding shape/color combination in the attribute column. The names of the shapes and colors are selected to be substantially phonetically different, so as to decrease the probability of interpretation. That would be especially useful to resolve items, e.g., names of persons, that sound very similarly to one another or are not clearly pronounced. The user is enabled to invoke a graphically assisted voice interface in the above example at his/her discretion, e.g., by pressing a button. Alternatively, the shapes and colors can be implemented as fixed buttons on the address book casing. The user is enabled to access records by pressing certain combinations of the buttons.

In another example, the information resolution approach is used for handheld information processing devices with Internet access (browsers) and displays, such as PDA's, palmtops, web pads, mobile phones using, e.g., the WAP (wireless application protocol) technology, Bluetooth, 802.11, etc. Such devices can use browsers for retrieving and navigating web pages from the Internet, but they cannot render a page in its entirety without losing information. The lay-out and general appearance of the image of the page, however, indicate whether portions may or may not be of interest to the user, e.g., as containing hyperlinks. In order to facilitate access to a particular part of the page, high level HTML tags, such as "image", "text", "paragraph" can be used to present an overview of the page. Top-level XML tags can be used as well. The system is enabled to respond to voice commands indicating a particular part of the page, e.g., "image". If multiple images are present on the page they can be denoted by number, color, special symbol, etc. The system is enabled to respond to commands indicating attributes of an information item. For example, on a color screen a blue bar denotes the first image while a green bar denotes another, so that command "blue image" enables the user to zoom-in on the first image. On a black-and-white screen, an information item can be denoted by symbols with clearly distinguished shape, e.g., star, circle, rectangle, etc. Therefore, the system is enabled to respond to commands such as "star image", "circle text" and similar others.

The system of the invention preferably provides the user with customization options, such as alternative access modality preferences, e.g. voice, point/touch, buttons, etc., for a variety of levels in a multi-layered menu. PC- or Internet server-based software may guide the user to select information dimension, modalities, representation options, e.g., shapes, colors, language, pronunciation, etc., in a configuration stage. For example, the user is enabled to select alternative categories of shapes, such as geometry, fruits, animals, numbers, etc. The user is also enabled to download graphic sets and/or mapping software from a computer, e.g., network server, PC, PDA.

Figure 2:
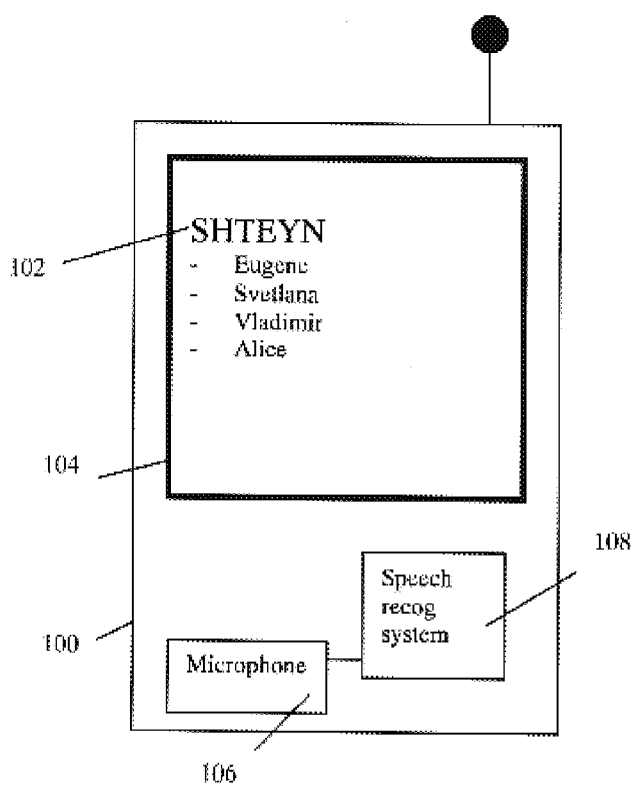
Figure 3:
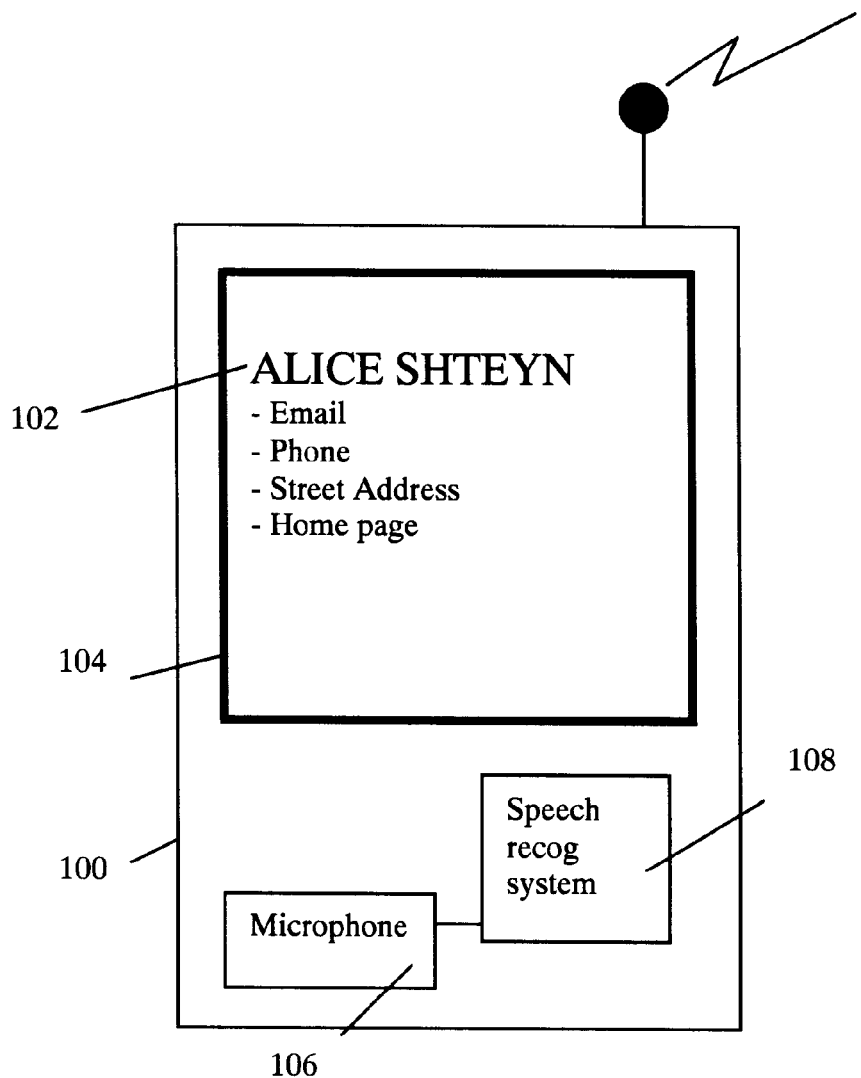

FIGS. 1, 2 and 3 are diagrams of successive layers in a UI of a communication device 100 with an electronic address book. Device 100, in this example, is a wireless appliance and comprises, for example, a cellphone functionality, an email functionality and an SMS functionality. The address book has a menu in the operational mode of device 100 to let the user select a name of an addressee, and a communication action to be performed for this addressee, e.g., initiate call, send instant message, send email, send SMS message, etc. A specific entry, here the family name "Shteyn", is selected by choosing the proper cluster of names, e.g., via a scroll button (not shown) or a soft tab key indicating the letter "S", or via voice input by pronouncing the "S" that is picked up by a microphone 106 and processed by a speech recognition system 108, etc. Then, the user touches the name's graphic representation 102 (e.g., an alphanumeric representation, an icon or image, etc.) in a first layer of the menu rendered on the device's touch screen 104. Alternatively, the specific entry is selected by pronouncing the name of the relevant person into microphone 106 coupled to speech recognition system 108. Information resolution of the voice interface in order to select a particular name in the first step is relatively low owing to, among other things, phonetic similarities between listed names. Another drawback is that speech recognition system 108 typically has to be trained for each individual name entry of the address book per individual user. It is therefore more convenient for the voice control to have each of the names, currently displayed on display 104, temporarily mapped onto a specific one of pre-defined attributes for which the voice control has been pre-programmed. The attributes here are presented in column 110. Scrolling the names up or down results into another sub-set of the names being displayed. Each subset rendered on display 104 can then be associated with the same pre-defined attributes for selection during operational use. That is, column 110 remains stationary when the user scrolls up or down the list of names. In the example shown, the attributes are geometric shapes. Alternatives to these are, e.g., different colors, numbers, etc. In the example shown with the current subset of names, the attribute "circle" is associated with the name "Shteyn"; the attribute "triangle" is associated with the name "Steen"; the attribute "moon" is associated with the name "Stein"; the attribute "square" is associated with the name "Steyn"; the name "Stijn" is associated with the attribute "triangle". The attributes in panel 110 are rendered, e.g., in a separate window on display 104, or are hard buttons on device 100, etc. A recommended modality cue 110 is displayed to indicate that the speech recognition system is activated. Selecting the addressee "Shteyn" now is accomplished via voice input by visually associating the displayed information item "Shteyn" with the graphical symbol "circle" and saying the word "circle", or by touching the circle on touch screen 104. Accordingly, the selection mechanism uses the visual mapping of the semantic content of the name "Shteyn" onto an (abstract) attribute, here "circle" and pronouncing the name for the latter. The selection thus involves a hybrid combination of visual aspects and voice. Upon selection of the addressee's name "Shteyn", the menu evolves to a next state shown in FIG. 2.

FIG. 2 shows display 104 once an entry, here the addressee's last name "Shteyn", has been selected. The address book's menu shows that there are four possible options for this choice: "Eugene", "Svetlana", "Vladimir" and "Alice". The user would like to give Alice Shteyn a call. In order to select the entry "Alice", the attribute mapping of FIG. 1 could be used. However, voice input via system 108 is more convenient because of the limited number of options available at this level for which the information resolution is high enough to use voice input. The user speaks the word "Alice" to select this addressee. Upon selecting "Alice" the menu may graphically evolve to a next level, that lists the options for contacting Alice: her telephone number, her email address, her pager number, or icons representing these contact information items, etc. See the diagram of FIG. 3. Note that in the operational mode the numbers or email addresses need not be rendered, as the user is only interested in initiating the contact via device 100 in a certain communication mode, not necessarily in the exact contact information being used therefor. The rendering of the communication options listed for Alice can even be omitted at all, as the user may pronounce "call" or "phone As the communication modes are limited and fairly standard for all addressees throughout the address book, the user pronounces "call" or "phone" in this example. Note that the rendering of the communication options listed for Alice can even be omitted at all, as the user may pronounce "call" or "phone" immediately after pronouncing "Alice" so that the menu level of FIG. 2 is the end of the selection process. Thereupon, the device dials the number listed for Alice Shteyn's personal cellphone and initiates the call.

Figure 4:
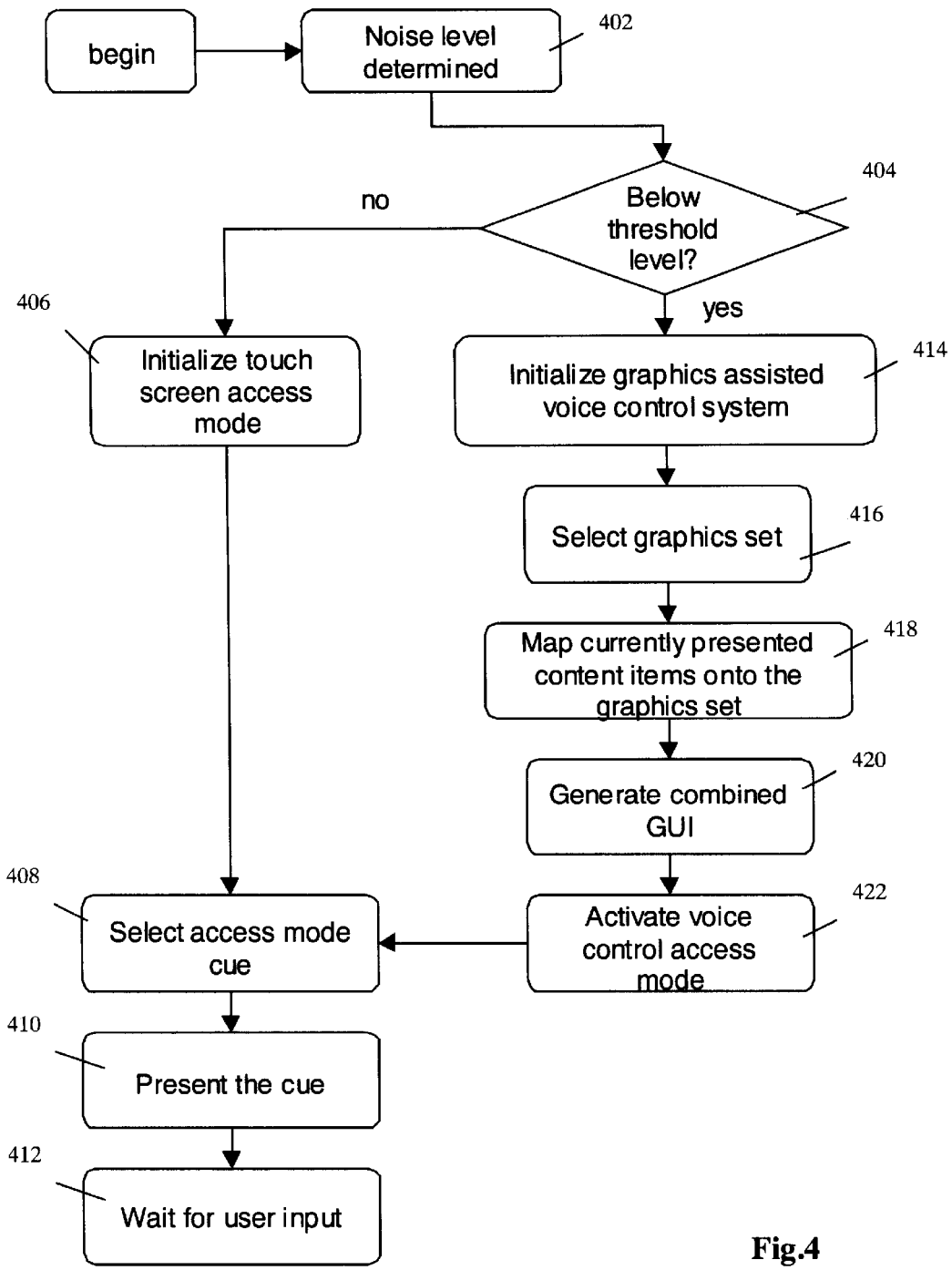
FIG. 4 is a block diagram of a graphically assisted voice control system for an electronic address book.

FIG. 4 is a flow diagram illustrating a process of user interaction with an implementation of a device or system according to the invention that allows voice input and other modalities of user-interaction. In step 402, the ambient noise level is determined and compared to a threshold level in step 404. If the ambient noise level not below a certain threshold, the touch screen access mode is activated in step 406. The device also selects the appropriate access mode cue in step 408 to notify the user of the access mode selected, e.g., graphical mode, and presents it to the user in step 410. The user then can provide input through the touch screen. If the ambient noise level is below the threshold, the device of system initializes in step 414 a graphics-assisted voice-control system. In step 416 a graphics set is selected, e.g., automatically by the system or manually or via voice input by the user. A graphics set comprises a collection of icons or signs, e.g., the set indicated by reference numeral 110, rendered on a display monitor. A binding mechanism is established in step 418 in order to create an association between the icons or signs on the one hand, and information items graphically represented, e.g., the names in FIG. 1. In step 420 a combined GUI is generated, e.g., the one shown in FIG. 1 with the names and the icons rendered. In step 422, the voice control access mode is activated and the access mode cue is selected as explained under step 408 above.

Figure 5:
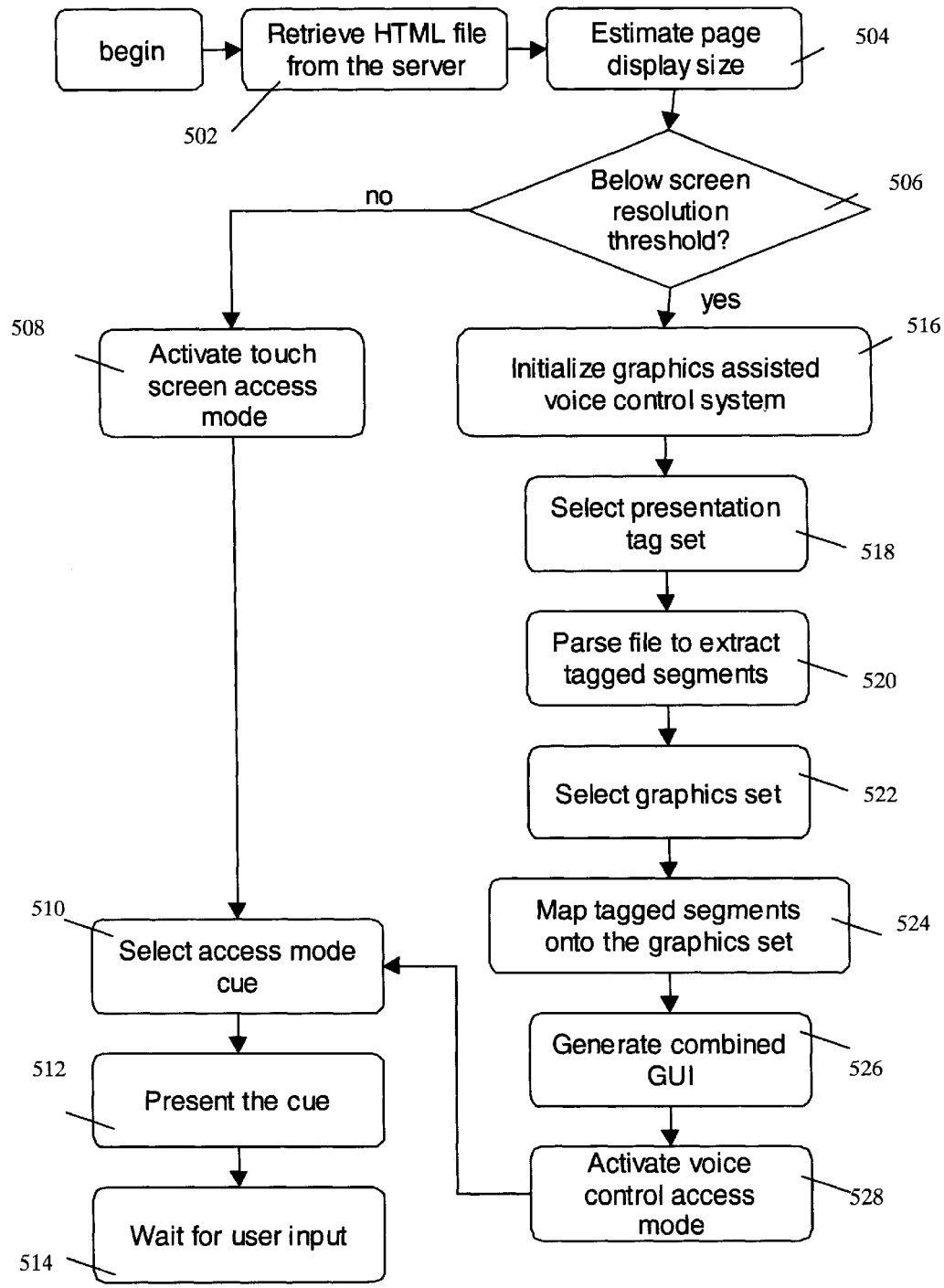
FIG. 5 is a block diagram of a graphically assisted voice control system for a tagged content (HTML, XML) presentation interface.

FIG. 5 is a flow diagram illustrating a graphically assisted voice control system in the invention for a tagged content (e.g., HTML, XML) presentation interface. In step 502, the user device, or a proxy acting on behalf thereof, receives from a server an HTML file requested by the user. The HTML file may represent a web page, a user interface representation, e.g., a UPnP device interface, etc. In step 504, the page display size, e.g., in pixels, is estimated. HTML page size determination is well known in the art. For example, the source code of the Netscape web browser is available on the Internet, e.g., from www.mozilla.org. In step 506 the required presentation size is compared to the actual device display size or the area available for presentation in order to determine whether the resolution threshold is lower than required. The threshold can be represented, for example, by a ratio between the required size of the page and the actual available size of the screen. An image scaling capability of the device may be taken into account as well. If the presentation requirements exceed the threshold, in step 508 the full touch screen access mode is activated. Otherwise, in step 516 the graphics assisted voice control system is initialized. The initialization step may involve loading into memory program instructions and/or data segments of the processes involved into the next steps of the process. The segments may reside on the device itself or on another device, e.g., a personal computer or an Internet server. In the latter case, the devices are connected via a wired or wireless network. In step 518 a presentation tag set is selected. In the given implementation, the tag set comprises a list of HTML tag names, e.g., IMG, FORM, TABLE, etc, and optionally the threshold pixel sizes of elements they represent. The tags can represent standard attributes of an HTML document and/or proprietary extensions related to a particular document type. In the implementation described herein, the HTML document represents an instance of a hypermedia content utilized on the Internet and generally written in what is referred to as a "markup language". SGML is one of such languages for describing the structure of documents and for describing a tagging scheme to delineate that structure within the text. HTML, XML, XHTML are subsets of SGML that are widely being used in document representations and document communications. In step 520 the HTML file is parsed to extract information denoted by the tags listed in the tag set selected in step 518. The original file may be stored for future references or discarded, while the extracted information is prepared to be displayed, for example by stripping all the tagged data that does not fit the selected tag set. In step 522 a graphics set is selected to represent identified, tagged information on the display. The graphics set may comprise a set of icons, geometrical figures, tag names, etc. In step 524, the tagged information segments are mapped onto the graphics set to establish visual and audio correspondence between the two. In step 526 the combined GUI is generated to enable a display representation of the original HTML file. The combination may be implemented as an HTML file with tagged information segments and graphics set elements selected in step 522. In that case the graphics set elements are denoted by HTML tags, such as IMG, FONT, depending on the system configuration. In step 528 the voice control access mode is activated to enable "listening" and extracting voice command associated with the graphics set. In step 510 an access mode cue is selected to provide the user with an indication of a preferred access mode. In step 512 the cue is presented to the user and in step 514 the system is set to wait for user input. The process described above can be implemented on the presentation device itself or within a distributed or a client-server environment, as well as a combination of those. For example, for a device with insufficient computing recourses, e.g. mobile phone, a proxy server may execute steps from 504 to 526. In the latter case, the resulting HTML file, or its compressed image with indications of the preferred interaction modes, are sent to the device. In another implementation, presentation tag sets and graphics sets are stored on a server as part of user preferences database.

As noted before, the invention addresses a UI with user-selectable options and associated information resolution in order to provide ergonomic and user-friendly access to the options desired to be invoked or retrieved. This concept can also be applied to electronic program guides (EPGs) or electronic content guides (ECG). That is, pieces of content information represent options to choose from. The options could be organized or clustered in the UI according to type (e.g., audio, video, games, communications such as instant messaging, etc.) and within a type, according to another criterion, e.g., further sub-categories (being currently broadcast, going to be broadcast shortly, recorded, available on demand such as from a VOD service, available from local jukebox, etc. etc.), title or preference ranking, etc. The EPG's or ECG's access mode and/or representation of the options per organizational level or cluster is determined, controlled or otherwise affected by the associated level of information resolution suitable for the user to effectively interact with the EPG or ECG.

As to EPG and ECG, reference is made to U.S. Ser. No. 09/568,932 U.S. 000106) filed May 11, 2000 for Eugene Shteyn et al., et al., for ELECTRONIC CONTENT GUIDE RENDERS CONTENT RESOURCES TRANSPARENT, herewith incorporated by reference. This document relates to the use of the personalization features as provided by, e.g., the Hard-Disk-Drive (HDD)-based Personal TV Receiver and a home network, to allow for a much more customized view on a wider range of content information available to the individual user than was possible heretofore. A data management system is provided that combines the data of an EPG with other data for other types of content information, typically within the context of a home entertainment system. The system comprises a data base for representing schedule information associated with scheduled content information from a content provider such as a broadcasting station or a video-on-demand (VOD) service. In addition, the data base also represents inventory information that is associated with content information available from another resource, e.g., as recorded at the consumer's digital Personal TV Receiver during previous broadcasts, or from a CD or DVD jukebox. Accordingly, a general type of guide is introduced hereby, herein after referred to as an electronic content guide (ECG). In an even more general aspect, U.S. Ser. No. 09/568,932 provides a data management system for a home network with multiple resources. The system stores respective data descriptive of respective content information available from a respective one of the multiple resources on the network. The system combines the respective data in a single menu so that the user can select from the content information available. The multiple resources comprise, for example, a receiver for receiving first content information from external to the home network and a play-out apparatus for playing out second content information that is locally available in pre-recorded format. In addition, the menu can also represent content information available at a Web site with a specific URL, or available as email content information, as electronic advertisements, or as video games. By means of presenting the aggregate available content information regardless of its resource, the consumer is provided with a much wider range of options than conventional EPG's can provide, if only for the fact that these do not offer the content information recorded by or local to the individual consumer in a single menu

I claim:

1. An electronic device, comprising:
a UI, the UI being enabled to present a first set of user selectable items having a first modality of interaction that comprises a sensory or physiological process and a second set of selectable items comprising attributes that each map to a specific item in the first set, the items in the first set having a lower information resolution than the items in the second set, an item in the first set being selectable through selection of the mapped attribute item in the second set, the selection of the item causing the UI to render a third set of items for the user to select from using a second modality of interaction that comprises a sensory or physiological process different from the first modality.

2. The device of claim 1, wherein at least the first modality or the second modality is programmable in a configuration mode of the UI.

3. The device of claim 1, wherein an additional modality of the user interaction with the UI is available for the selecting from at least the first or the second set of items.

4. The device of claim 1, comprising a communication functionality.

5. The device of claim 1, wherein:
the device has a touch screen;
the device has a microphone for voice input;
one of the first and second modalities involves touching the touch screen;
the other of the first and second modalities involves the voice input.

6. The device of claim 1, comprising:
a display monitor for rendering at least some of the items in the first set; and
first means for enabling ths user to associate each respective one of the rendered items with a respective one of a plurality of predetermined attributes.

7. A computer-implemented method for information resolution on an electronic device, comprising:
providing a UI enabled to present a first set of user selectable items having a first modality of interaction that comprises a sensory or physiological process and a second set of selectable items comprising attributes that each map to a specific item in the first set, the items in the first set having a lower information resolution than the items in the second set, an item in the first set being selectable through selection of the mapped attribute item in the second set, the selection of the item causing the UI to render a third set of items for the user to select from using a second modality of interaction that comprises a sensory or physiological process different from the first modality.

8. The method of claim 7, wherein one of the first and second modalities involves a touch screen and wherein the other involves voice input.

9. A computer readable medium having encoding for a UI, the UI being enabled to present a first set of user selectable items having a first modality of interaction that comprises a sensory or physiological process and a second set of selectable items comprising attributes that each map to a specific item in the first set, the items in the first set having a lower information resolution than the items in the second set, an item in the first set being selectable through selection of the mapped attribute item in the second set, the selection of the item causing the UI to render a third set of items for the user to select from using a second modality of interaction that comprises a sensory or physiological process different from the first modality.

10. The medium of claim 9, wherein one of the first and second modalities involves a touch screen and wherein the other involves voice input.

11. The medium of claim 9, wherein the UI comprises an electronic program guide.

12. An electronic program guide having a UI enabled to present a first set of user selectable items having a first modality of interaction that comprises a sensory or physiological process and a second set of selectable items comprising attributes that each map to a specific item in the first set, the items in the first set having a lower information resolution than the items in the second set, an item in the first set being selectable through selection of the mapped attribute item in the second set, the selection of the item causing the UI to render a third set of items for the user to select from using a second modality of interaction that comprises a sensory or physiological process different from the first modality.

* * * * *